July 5, 1960
J. W. VAN RIPER
2,943,352
PLASTIC MATERIAL EXTRUSION HEAD
Filed July 3, 1957
4 Sheets-Sheet 2
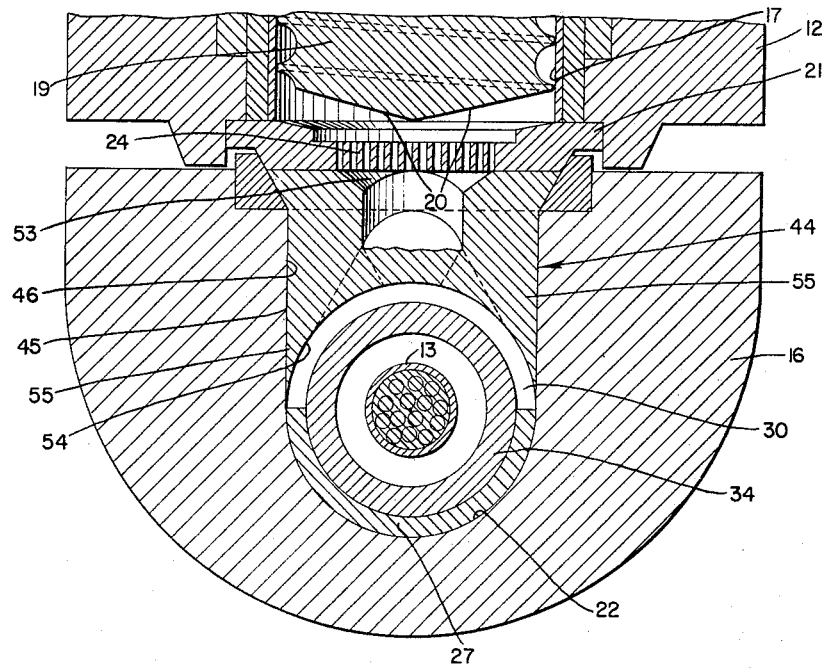
Fig. 2
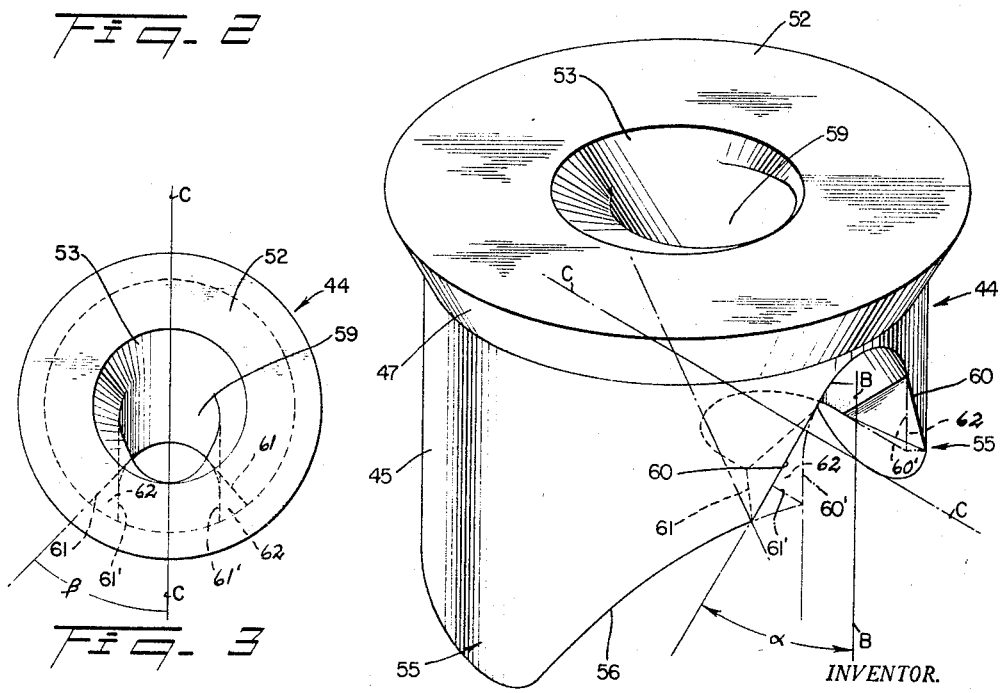
Fig. 3
Fig. 4
INVENTOR.
JURIAN W. Van RIPER
BY
Alfred W. Nibber
ATTORNEY July 5, 1960
J. W. VAN RIPER
2,943,352
PLASTIC MATERIAL EXTRUSION HEAD
Filed July 3, 1957
4 Sheets-Sheet 3
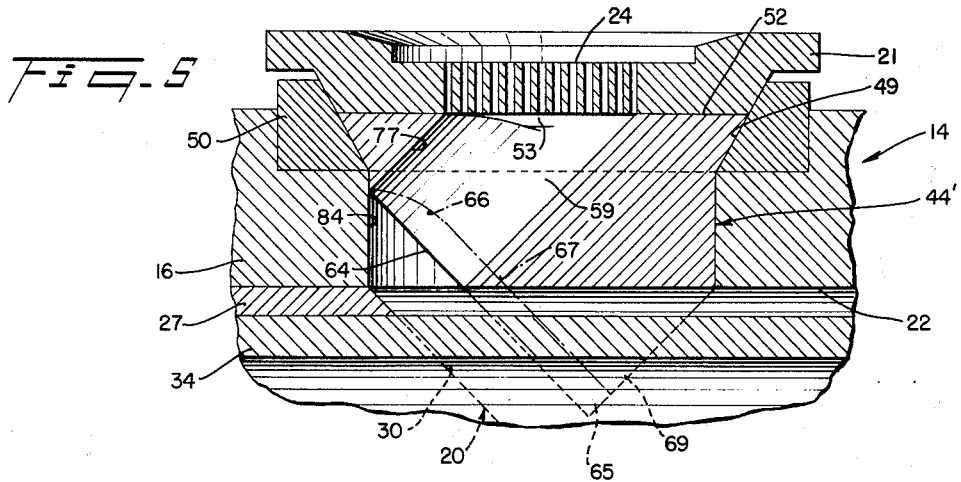
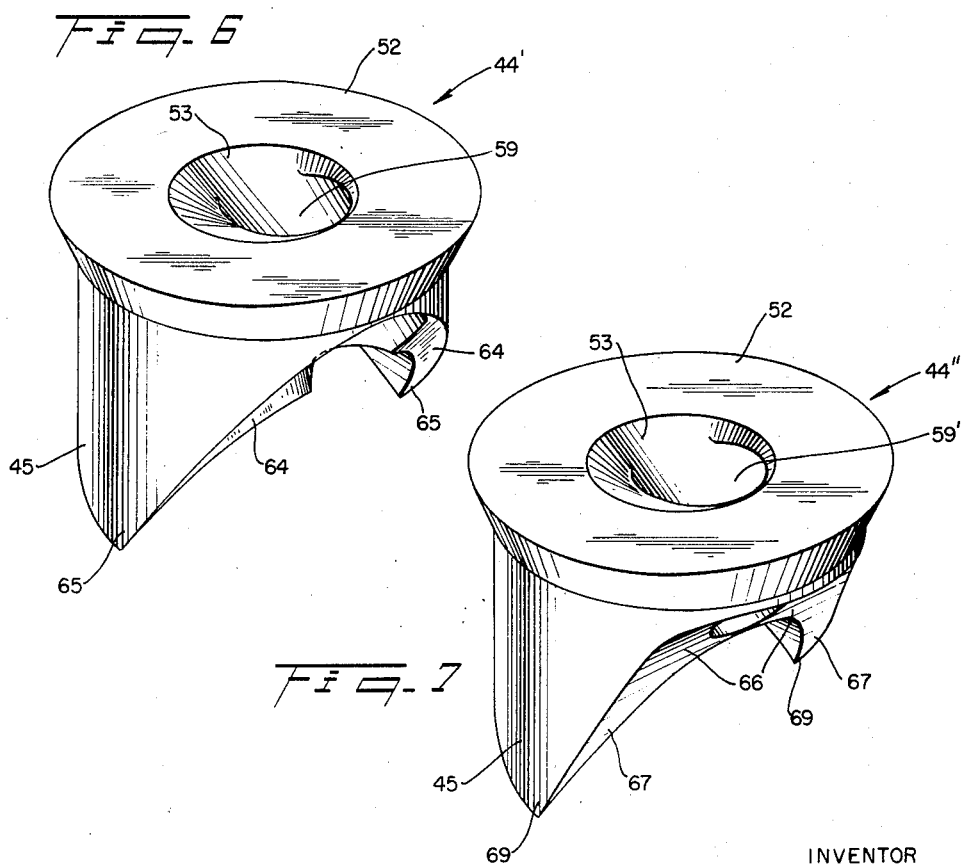
INVENTOR
JURIAN W. Van RIPER
BY *Alfred W. Vibber*
ATTORNEY July 5, 1960     J. W. VAN RIPER     2,943,352
PLASTIC MATERIAL EXTRUSION HEAD Filed July 3, 1957     4 Sheets-Sheet 4

*INVENTOR.*
JURIAN W. Van RIPER
BY
ATTORNEY

United States Patent Office 2,943,352
Patented July 5, 1960

2,943,352

PLASTIC MATERIAL EXTRUSION HEAD

Jurian W. Van Riper, 208 Beechwood Road,
Ridgewood, N.J.

Filed July 3, 1957, Ser. No. 669,724

9 Claims. (Cl. 18—13)

This invention relates to an extrusion head for plastic material extruding apparatus, and more particularly relates to a cross-head for extruding plastic material in continuous lengths.

Typical of the extrusion operations in which the extrusion head of the invention is of advantage is that in which a core such as a cable is fed through the head and during its travel therethrough is provided with a continuous sheath or coating of plastic material. In such apparatus it is usual, for reasons of convenience of design, to dispose the extrusion head transversely to the plastic material plasticizing and delivery means, such as an extrusion barrel and screw arrangement. As a result, the plastic material flowing from the extrusion barrel must make a right angle turn as it travels into the cross-head to flow around the core guide, the core itself, and finally to travel outwardly to the plastic material-shaping die in the form of a sheath on the core.

Such type of extrusion head inevitably requires different particles of the plastic material to travel different distances as the material leaves the first path, which includes the delivery means and its outer terminus, formed for example by a breaker plate, flows into a second, connecting path, and finally flows therefrom into a third path, disposed generally at right angles to the first path, longitudinally in the cross-head. The thus treated plastic material, being under high pressure, acts somewhat as a liquid of a viscous nature, and thus tends to take the path of least resistance, which is around the inner corners of the zones of intersection between the first path and the second path and between the second path and the third path. The plastic material thus tends to flow unevenly in the second and third paths, and tends to stagnate at the rear of the intersections between the successive paths of flow which lie rearwardly of the cross-head. Such tendency to stagnation of the plastic material at such zones is more pronounced where the die resistance is low. When the plastic material is of such character that it becomes more viscous when held under elevated temperatures for appreciable periods, the stagnated zones thereof particularly adversely affect the product, since portions of the stagnated plastic material tend to break off from time to time and to become incorporated in the extrusion products such as the sheath of a cable, thereby resulting in a cable sheath which is non-uniform in properties. Also, such stagnant plastic material becomes hard or at least semi-hard, so that it may form zones of mechanical weakness in the portion of the sheath or other extruded plastic product which travels past it.

It is among the objects of the present invention to provide an improved conveying means for plastic material being forwarded under pressure in apparatus of the type wherein the plasitc material must be diverted through an appreciable angle in its travel therethrough.

Another object of the invention resides in the provision of an extrusion cross-head for a plastic material extruding machine, said cross-head incorporating novel plastic material guiding means whereby the plastic material tends to travel throughout the head and consequently through the die at a more uniform rate circumferentially of the head and of the die passage.

Yet another object of the invention, in one specific embodiment thereof, lies in the provision of an improved cross-head for a core-sheathing plastic material extruding machine, wherein the core guide is supported by a sleeve-like member having a plastic material guiding end surface for diverting the plastic material in the chamber toward the die, such cross-head incorporating novel mechanism for guiding the plastic material in its second path whereby to reduce or eliminate stagnant portions of the plastic material at the intersection of the second and third paths of the apparatus.

Still another object of the invention resides in the provision in apparatus as set forth in the preceding paragraph of a novel insert block incorporated in the wall of the chamber of the cross-head and defining the second path of flow of the plastic material, such insert block cooperating with the sleeve-like member which diverts the plastic material toward the die in such manner as to eliminate reentrant or inwardly directed angles at the rear of the intersection of the second and third paths of flow of the plastic material.

Yet another object of the invention, in one embodiment thereof, resides in the provision in apparatus as set forth in the two preceding paragraphs of means whereby the diameter of the passage defining the second path of flow of the plastic material is appreciably smaller than the diameters of the passages defining the first and third paths of flow of the plastic material.

A still further object of the invention, in one specific embodiment thereof, lies in the provision of an improved cross-head for a core-sheathing plastic material extruding machine, wherein the plastic material travels through a first path to a second path and thence into a third path disposed longitudinally of the cross-head, of mechanism defining a passage for the plastic material between the material delivering means and the chamber in the cross-head which inclines rearwardly in the direction from the material delivering means to the chamber of the head, whereby to spread the plastic material to each side before it starts its forward travel in the cross-head chamber, the configurations of the parts being such that the surfaces at the rear of the continuous material conducting path between the material delivering means and the chamber in the head contain no reentrant angle.

The above and further objects of the invention relating to economies of use and manufacture thereof will be more fully apparent in the following description of a preferred embodiment of the invention as shown in the accompanying drawings. It is to be expressly understood that the illustrative embodiment of the invention is not to be taken as limiting the invention, since the invention is capable of numerous variations, some of which will be pointed out hereinbelow.

In the drawings:

Fig. 2 is a fragmentary view in transverse section through the apparatus of Fig. 1, the section being taken generally along the line 2—2 of Fig. 1.

Fig. 3 is a view in end elevation of an insert block containing a passage for the flow of plastic material from the delivery means to the cross-head chamber, the view being taken in a direction from the top to the bottom of the sheet of Fig. 2.

Fig. 4 is a view in perspective of the insert block shown in Fig. 3.

Fig. 5 is a fragmentary view in horizontal section through a cross-head in the vicinity of a flow-controlling insert therein, a second embodiment of insert block in accordance with the invention being shown in full lines, a modification of such block being shown in phantom lines.

Fig. 6 is a view in perspective of the second embodiment of insert block.

Fig. 7 is a view in perspective of the third embodiment of insert block, which is shown in phantom lines in Fig. 5.

Although the apparatus of the invention is illustrated and described herein as a cross-head used to provide a continuous plastic sheath on a core such as a cable, it will be understood that, within its broader aspects, the invention may be used to advantage in the extrusion of hollow plastic shapes such as continuous tubes, and also in the extrusion of continuous solid shapes such as bars and rods.

In the embodiments of the apparatus shown, plastic material is supplied by a conventional barrel and screw arrangement. The barrel of the extruding machine is shown fragmentarily at 10, the cross-head generally designated 11 being affixed to the outer end of the barrel. Specifically, the cross-head shown has a first fixed portion bolted to the barrel and an active, sheathing portion 14 attached to portion 12 by the hinge 15, portion 14 being adapted to be held in the operative position of Figs. 1 and 2 by studs (not shown).

Figure 1:
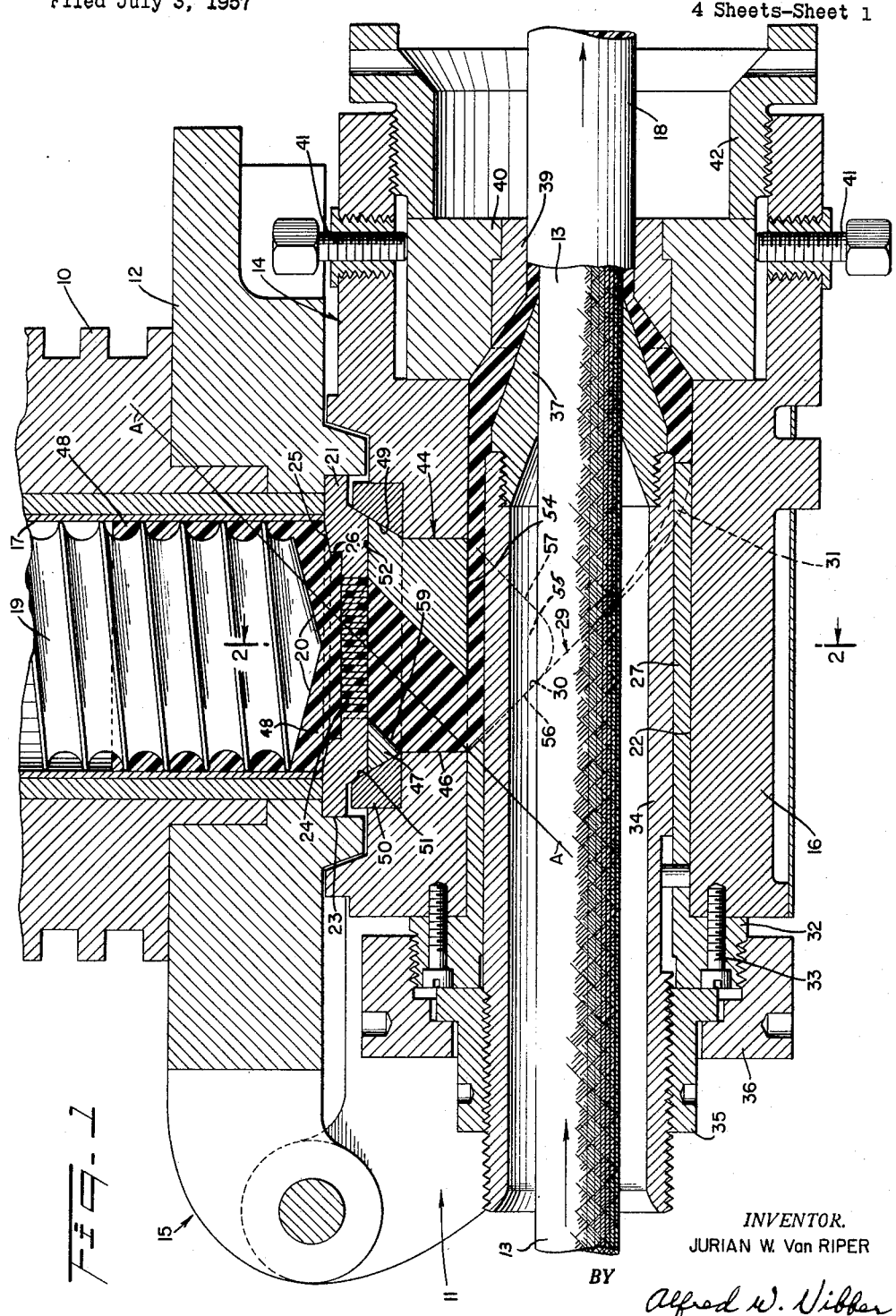
Fig. 1 is a fragmentary view in horizontal section through a cross-head and a portion of an extrusion machine barrel of an apparatus in accordance with a first embodiment of the invention.

Portion 14 of the head has a generally part-cylindrical member 16 having a longitudinally extending chamber 22 having an outer wall in the form of a bore therein disposed transversely to the passage 17 in the barrel 10. The axes of the passage and the chamber lie in a common horizontal plane. Plastic material 48 forwarded through the barrel by the rotary driven screw 19 passes under high pressure in a first path through the screen portion 24 of breaker plate 21 which is sealingly disposed across the forward free end of passage 17. Plastic material issuing through the openings in screen 24 passes into and through a rearwardly inclined passage 59, in a second path, and thence into the chamber 22 in the cross-head in which it eventually travels forwardly in a third path. End plate 21 is snugly received within a counterbore 23 in portion 12 of the head. The outer portion of the rear, material receiving surface of plate 21 is in the form of a frustum 25 of a shallow cone which terminates in a central counterbore 26 of somewhat greater diameter than the perforated screen portion 24. To facilitate flow of the plastic material from the end of screw 19, the free end of such screw is made in the form of a cone 20 of broad apex angle, elements of the cone being shown generally parallel to elements of surface 25. As shown in Fig. 1, a core 13 of a cable, traveling through the cross-head in a direction from left to right, receives a tubular sheath of plastic material thereover so that it issues from die 39 in the form of a sheathed insulated cable 18. The active, plastic material containing portion of chamber 22 has its rear (left, Fig. 1) end formed by the forward edge on end 29 of an outer tubular member 27 positioned in chamber 22. Such forward end surface 29 is preferably, although not necessarily, in the form shown in applicant's Patent No. 2,760,230, dated August 28, 1956, wherein the upper (Fig. 1) half thereof is in the form of a slanted flat annulus lying at an angle of 45° with respect to the longitudinal axis of member 27, the lower (Fig. 1) side surfaces (not shown) being in the form of oppositely disposed right helicoids which are mirror images of each other.

Member 27 is retained within chamber 22 by an enlarged flange-like projecting head 32 which overlies the rear end of chamber 22, member 27 being held or secured on part 16 by studs 33 projecting through such head 32 as shown.

Snugly fitting within member 27 and extending longitudinally thereof is an inner tubular core guiding member 34 which is retained in longitudinally adjusted position by a sleeve-like nut 35 screwed onto the rear end of member 34, and by an annular outer nut 36 the forward end of which has screw threaded engagement with head 32 of member 27 and the rear end of which has an inwardly projecting flange which overlies and tightly engages an outwardly projecting flange at the forward end of sleeve-like member 35. The forward end of guiding member 34 carries a guide head 37 screwed thereto as shown, the guide head having a central longitudinal passage therethrough snugly receiving cable core 13. The outer surface of head 37 is in the form of a forwardly converging frustum of a cone.

A centrally disposed die 39 has a passage therethrough defining the exit end of the chamber 22 in the cross-head. Die 39 is held in a die holder 40 which is vertically and horizontally adjustable with respect to the axis of guide member 37 by a plurality of oppositely disposed studs 41 (two shown). Die holder 40 is retained in adjusted position by an outer hollow retaining nut 42 which has threaded engagement with the inwardly threaded forward end of portion 16 of the cross-head.

The intermediate path of flow of the plastic material, between the material delivering means and the chamber in the cross-head, is provided by an insert or velocity block 44 which is located in a recess in the part of portion 16 of the cross-head which confronts the outer surface of breaker plate 21. Block 44 has a main circular cylindrical side surface 45 which is shown disposed vertically in Figs. 1, 2, and 4, such side surface accurately and snugly fitting within a circular cylindrical opening having a side wall 46 in portion 16 of the head. The rear end of block 44, shown at the top in Figs. 1, 2 and 4, is of frusto-conical shape, as shown at 47. In the construction shown, there is employed an annular filler ring 50 tightly received within a counterbore in portion 16 of the head, the filler ring having a downwardly (Fig. 1) converging frusto-conical inner surface 49 of the same apex angle as end 47 of filler block 44, so that such surfaces make sealing engagement with each other. Filler ring 50 has an axial length somewhat exceeding the axial length of portion 47 of block 44, so as sealingly to receive therewithin an outer frusto-conical surface 51 on breaker plate 21. In the construction shown, when the studs retaining portions 12 and 16 of the cross-head together are removed and portion 16 is swung about hinge 15, breaker plate 21 remains on portion 12 of the apparatus whereas filler ring 50 and insert block 44 swing with portion 16 of the head.

In the illustrative embodiments the insert or velocity block is shown as a separate part inserted in a bore in the side wall of cross-head member 16, and filler ring 50 is also shown as a separate part. It will be understood, however, that in an alternative construction filler ring 50 may, if desired, be made integral with block 44, and also, in a further alternative construction, that both ring 50 and block 44 may be made as integral parts of the side wall of cross-head member 16.

The rear (upper Fig. 1) end surface 52 of block 44 is flat, and forcibly and sealingly engages the confronting flat outer or front surface of breaker plate 21. As shown most clearly in Figs. 2 and 4, the front (lower, Fig. 1) surface of block 44 is in the form of a part of a horizontally disposed circular cylinder having the same diameter and axis as chamber 22 in portion 16 of the head. The inner surface of block 44 is designated 54. As a consequence of such configuration, block 44 has two similar side wing portions 55 which are mirror images of each other. The rear edges 56 of each of wings 55 lie in a plane disposed at a marked angle with respect to the longitudinal axis of bore 22, the parts being of such configuration and size that edges 56 snugly engage the rear slanted portion 56 of the tube 27, as shown in Fig. 1. In the illustrative embodiment, the above referred to angle is 45°; it will be understood that, within the teaching of the invention such angle may be varied appreciably as dictated by the design of the particular cross-head. The wings of block 44 are of such length axially of barrel 10 that they terminate only a short distance rearwardly (upwardly, Fig. 1) of the longitudinal axis of core guide 34, as shown. Preferably the forward and rear edges 57 and 56, respectively, of wings 55 arcuately merge, as shown in Fig. 1. In the embodiment shown, forward edges 57 of wings 55 also lie in a plane, being disposed at an angle of 90° with respect to rear edges 56.

The above described second path of the plastic material is provided by a rearwardly and downwardly (Fig. 1) slanted circular cylindrical passage 59 in block 44. The rear end of passage 59, which would otherwise intersect surface 52 in an ellipse, is provided with a countersunk portion 53, the outer edge of portion 53 being a circle which confronts and mates with the active portion 24 of breaker plate 21, as shown. In the illustrative embodiment, passage 59 is inclined downwardly and rearwardly at an angle of 45 degrees with respect to the axis of chamber 22, and the center line A—A of passage 59 intersects the plane of surface 56 at the upper (Fig. 1) edge of the outer surface of guider tube 34. As a consequence, in the embodiment shown one portion (generally one-half) of the area of passage 59 immediately confronts the upper surface 56 at the forward end of guider tube 27. The remainder of the area of passage 59 immediately confronts and intersects the rear portion of bore 46 which receives block 44 in portion 16 of the head. It will be understood that the angularity of the passage 59 relative to the axis of the chamber 22, and the location of the intersection between axis A—A of passage 59 and the plane of surface 56 may be varied appreciably within the teaching of the invention.

It will be noted, tracing the path of the plastic material from the rear edge of the screen 24 of the breaker plate along the rear edge of the passage 59, thence along the rear of side wall 46, and finally along the upper forward edge 56 of the guider tube 27, that such plastic material in the rear of such continuous path of travel in no instance is required to flow through a reentrant angle. Stated in another way, the plastic material at no one zone in the rear of its continuous path of travel is required abruptly to reverse its direction of travel. Such condition is also true in all sections on both sides of and parallel to the central section through the apparatus depicted in Fig. 1. Consequently there are no traps in the flow passage of the plastic material in which material may tend to stagnate, and thus progressively deteriorate, whereby it would present the difficulties outlined above.

The construction of insert or velocity block 44, of passage 59, and particularly of the intersection of such passage with side wall 46 of the opening through the chamber sidewall and with the inner circular cylindrical surfaces 54 of the block, will be more readily apparent upon consideration of Figs. 3 and 4. Fig. 4 will best be understood by visualizing the portion of passage 59 which emerges onto and intersects the generally vertical extending outer wall of block 44 as being closed by the embracing side wall 46 of portion 16 of the cross-head. It is a condition necessary to the present invention, when a filler block and surrounding structure are employed generally as shown, that the rear of the geometrical figure resulting from the intersection of passage 59 with side wall 46 shall have no reentrant angles measured from a central vertical (Fig. 4) plane through passage 59. In Fig. 4, for simplification, such plane is depicted by an element B—B thereof.

In Fig. 4 a preferred configuration of the intersection between passage 59 and side wall is shown in full lines, an alternative, limiting, configuration of such intersection being shown in phantom lines. The full line configuration results, in effect, from the removal of the corner portions 62 from the outer end of the straight walled passage 59. In accordance with the invention, the rear opposite side edges of the figure resulting from the intersection between the walls of passage 59 and side walls 46 must in no case converge rearwardly. Stated in another way, the angle α between the edges 60 of the figure in question and the line B—B shall in no instance be a negative one. The edge 60' of the alternative intersection figure lies at an angle of 0° with respect to line B—B, and thus shows a limiting condition of the angularity of the rear side edges of such figure.

The geometrical figure resulting from the intersection of the outer end of passage 59 with the inner surface 54 of block 44 is likewise subject to essentially the same limitations, that is, the rear side edges must not converge in a direction from front to rear. In Fig. 3 the rear side edges of such portion of the figure of intersection, shown in full lines, are designated 61, such side edges being shown lying at an angle β with respect to a vertical central plane through passage 59, such plane being shown as one of its elements C—C in Figs. 3 and 4. The end position or terminus of the range of the angle at which the side edges 61 may lie with respect to such plane is shown at 61', wherein such edges 61' lie parallel to the line C—C. Such terminal condition corresponds to the terminal position of the other side edges 60, shown at 60' in Fig. 4.

It will be seen that, when the rear side edges of the two geometrical figures of intersection above discussed lie within the disclosed ranges of angularity with respect to each other, there are no reentrant angles anywhere in the rear of the continuous passage from the plastic material delivering means to the chamber in the cross-head, including the rear of the zones of intersection of the second and third paths of travel of the plastic material. As a consequence, there are no zones in the rear of the continuous passage in which the plastic material can become stagnant. Since, as above noted, the plastic material tends to flow in the shortest path, there is no problem of stagnation of the plastic material in the forward portion of the continuous passage, even though such forward portion may contain some reentrant angles.

In Figs. 5, 6, and 7 there are shown two further embodiments of plastic material extruding heads made in accordance with the invention. Such heads incorporate insert or velocity blocks 44' and 44", respectively. The insert blocks of such two further embodiments are generally the same as that shown in Figs. 3 and 4, except for the configuration of the rear surface of the block. Consequently, parts of the apparatus shown in Figs. 5, 6, and 7 which are the same as those shown in Figs. 1 to 4, inclusive, are designated by the same reference characters. In general, the configuration of the rear surface of each of blocks 44' and 44" is such as to further open up the plastic material-receiving space defined by the wall of passage 46 in head portion 16, the end surface 30 of spacer tube 27, and the chamber within passage 22 in the head. As a result, greater uniformity of flow over core guide 37 and through die 39 of some of the more difficultly workable plastic materials is obtained.

In the embodiment shown in Fig. 6 and in full lines in Fig. 5, the rear surface 64 of insert block 44' lies at an angle of 45° with respect to the longitudinal axis of the block. Thus, in Fig. 5 said surface 64 lies in a plane normal to the paper and at 45° with respect to the vertical. The lower sides or wings of block 44' are thus somewhat shorter in a vertical direction than wings 55 of block 44 of the first embodiment, and the lower ends 65 of such wings lie somewhat forwardly, or to the right, of the vertical axis of breaker plate 24. Rear surfaces 64 of the wings lie spaced appreciably forwardly of end surface 29 of spacer tube 27.

With block 44', as with the block 44 of the first embodiment, there are no reentrant angles at the rear of the passage allowing flow of the plastic material from breaker plate 24 into the chamber within passage 22 of the cross-head. In block 44' the effective area of such flow passage is increased and, with some plastic materials, there results a greater uniformity of flow of the material along surface 29 of the spacer tube and thence forwardly in the chamber in the head.

The insert block 44" shown in Fig. 7 differs from block 44' in that the rear surface thereof in its upper portion 66 is in the form of a part of a circular cylinder having its axis normal to the plane of the paper in Fig. 5. Portion 66 is of such extent vertically in Figs. 5 and 7 as to contain the entire delivery orifice of passage 59. The lower end of such part-circular cylindrical surface 66 merges smoothly on both wings of the block with a flat surface 67 which lies in a transverse plane extending normal to the paper in Fig. 5. The lower sides or wings of block 44" are thus shorter in a vertical direction than the wings in the second embodiment, surfaces 67 lie still further forwardly of surface 29 of spacer tube 27, and the lower ends 69 of the wings lie further forwardly or to the right (Fig. 5). This results in still further opening up of the plastic material-conducting passage, and with some materials is to be preferred by reason of the uniformity of distribution of the material around the chamber in the head which it yields.

Figure 8:
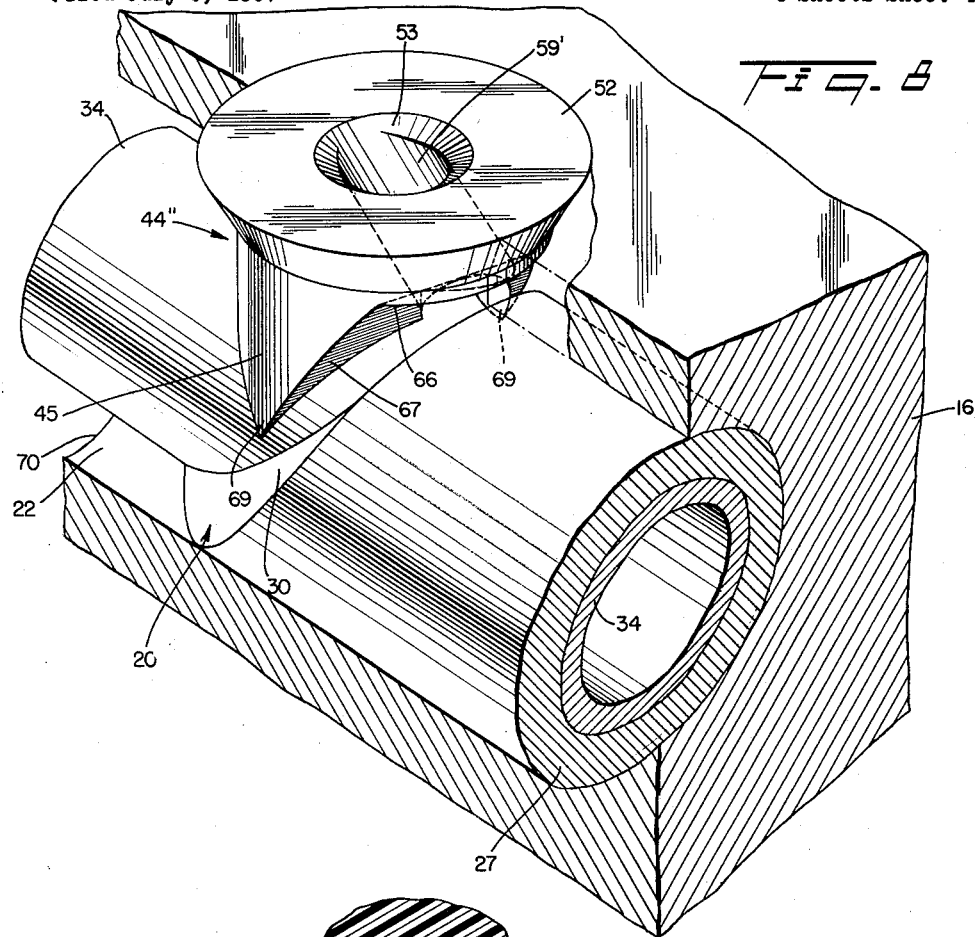
Fig. 8 is a fragmentary view in perspective in a direction from rear to front of a portion of the cross-head of the illustrative mechanism at the location of the plastic material delivering and diverting means at the rear or inner end of the chamber in the cross-head, the plastic material being omitted.
Figure 9:
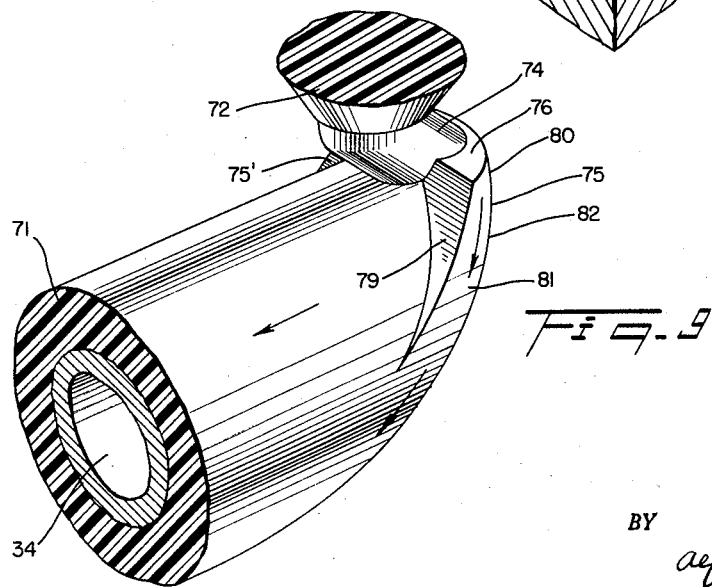
Fig. 9 is a fragmentary view in perspective in a direction from front to rear of the plastic material as it is formed by the portion of the mechanism shown in Fig. 8.

Fig. 8 further illustrates the mechanism employing the insert or velocity block 44" of Fig. 7 and (in the alternative form designated by lines 66 and 67 in Fig. 5) Fig. 5. Fig. 9 illustrates the plastic material as it is formed by the portion of the mechanism shown in Fig. 8.

The annular chamber formed between the wall of passage 22 in housing or body 16 of the cross-head and tube 34 is designated 70 in Fig. 8. The tubular portion of the plastic material shaped by such chamber is designated 71 in Fig. 9. As shown in Fig. 9, the plastic material occupies space 53 at the top of block 44" as a generally frusto-conical shape 72, flows downwardly in passage 59' to form a short rod 74, and is then spread sidewardly into a generally saddle-shaped form having opposite side portions 75 and 75' which are mirror images of each other. Such saddle-shaped form is shaped by the distributing channel presented by the opening in the cross-head having wall 84 (Fig. 5), by the velocity block 44", by the plastic material diverting means at the rear or inner end of the chamber 70, and by the tube 34.

Taking side portion 75 of the saddle-shaped plastic material distributing form as typical of portions 75 and 75', portion 75 has an upper surface 76 formed by contact with the upper wall 77 (Fig. 5) of passage 59', a forward surface 79 formed by contact with surfaces 66 and 67 of block 44", an upper rear surface 80 and side surfaces 81, both of which lie on a circular cylinder, surfaces 80 and 81 having been shaped by wall 84 of the opening through the cross-head wall in which block 44" is inserted, and slanting rear surface 82 somewhat below surface 80 and formed by contact with the slanting diverting surface 30 of member 27.

Whereas for purposes of illustration I have shown and described three preferred embodiments of the plastic material extruding head of the invention, it will be understood that such embodiments are illustrative only since the extruding head of the invention is capable of numerous variations as to details. Thus, for example, in the embodiment of Figs. 1 to 4, inclusive, the angle at which the center line A—A of passage 59 lies with respect to the bore 22 of the head may be varied appreciably, a terminal position in such range being one in which the line A—A lies generally at a right angle to the axis of chamber 22. It is also to be understood that, although the invention shows perhaps its greatest advantages in apparatus wherein the second path of the plastic material is of smaller cross sectional area than either the first or third paths, the invention is not limited thereto. The invention is, therefore, to be defined primarily by the claims appended hereto.

I claim as new the following:

1. Mechanism for extruding plastic material in continuous tubular form, comprising means for delivering plastic material under pressure, a cross-head disposed on the mechanism and having a first, elongated circular cylindrical passage for receiving plastic material from the delivering means, a die at the forward, outer end of the first passage for shaping the plastic material as it passes out of the cross-head, a delivery passage interposed between the delivering means and the first pasage, the axes of the first passage and the delivery passage lying in a common plane, the delivery passage having a diameter appreciably smaller than that of the first passage, an elongated circular cylindrical member extending axially within the first passage toward the die and forming with the first passage an elongated circumferentially continuous annular plastic material receiving chamber in the cross-head, means at the rear, inner end of the chamber for diverting the plastic material toward the die as it passes into the chamber from the delivery passage, said diverting means having an end surface facing and inclined toward the die in a direction away from the plastic material delivering means, and a distributing channel interposed between and connecting the inner end of the delivery passage and the rear end of the chamber, said distributing channel being generally saddle-shaped, symmetrical about the plane of the axes of the first passage and the delivery passage, and continuous through and for substantial distances on both sides of said plane, said distributing channel lying radially outwardly of the first elongated circular cylindrical passage in the cross-head, said distributing channel having a substantial portion of its rear surface formed by the portion of the diverting end surface of the chamber which lies closer to the inner end of the delivery passage, the radially inner surface of the distributing channel being formed by a portion of the outer surface of the elongated central circular cylindrical member in the first passage, and the forward surface of said distributing channel being formed by a surface spaced somewhat forwardly of the portion of the plastic material diverting surface at the rear end of the chamber and inclined in generally the same direction as such portion of said material diverting surface, the distributing channel communicating directly with the rear end of the chamber.

2. Mechanism for extruding plastic material in continuous tubular form as claimed in claim 1, wherein the forward surface of the distributing channel is generally parallel to the portion of the plastic material diverting surface at the rear end of the chamber.

3. Mechanism for extruding plastic material in continuous tubular form as claimed in claim 1, wherein the distributing channel has the portion of its rear and side surfaces which is closer to the delivery passage in the form of a portion of the surface of a circular cylinder having a diameter on the order of that of the first passage, the axis of said cylinder being disposed at a marked angle to the axis of the first passage and having its axis lying in the same plane as the axis of the first passage.

4. Mechanism for extruding plastic material in continuous tubular form as claimed in claim 3, wherein the axis of the said cylinder is disposed generally at a right angle to the first passage.

5. Mechanism for extruding plastic material in continuous tubular form as claimed in claim 3, wherein the diameter of the said cylinder is substantially equal to that of the first passage.

6. Mechanism for extruding plastic material in continuous tubular form as claimed in claim 1, wherein the projection of at least a portion of the delivery passage intersects the said end surface of the diverting means in the chamber.

7. Mechanism for extruding plastic material in continuous tubular form as claimed in claim 1, wherein the delivery passage inclines rearwardly from a location generally centrally of the exit end of the delivering means to the portion of the distributing channel which lies closer to the delivering means.

8. Mechanism for extruding plastic material in continuous tubular form as claimed in claim 1, wherein the cross-head has a housing containing the chamber, the housing has an opening therein extending from the chamber outwardly toward the means for delivering plastic material under pressure, and there is an insert block fitting in said opening, said insert block containing the delivery passage, the radially inner face of the block forming a portion of the radially outer surface of the chamber.

9. Mechanism for extruding plastic material in continuous tubular form as claimed in claim 8, wherein the opening is circular cylindrical, the diameter of said opening is substantially equal to that of the first passage, the axis of said opening is disposed generally at a right angle to the first passage, and a portion of the wall of the opening forms said circular cylinder.

References Cited in the file of this patent

UNITED STATES PATENTS

| | | |
|---|---|---|
| 699,459 | Dover | May 6, 1902 |
| 2,546,629 | Brillhart | Mar. 27, 1951 |
| 2,560,778 | Richardson et al. | July 17, 1951 |
| 2,573,440 | Henning | Oct. 30, 1951 |
| 2,732,587 | Greene | Jan. 31, 1956 |
| 2,732,588 | Myers | Jan. 31, 1956 |
| 2,760,230 | Van Riper | Aug. 28, 1956 |